Feb. 27, 1945.  L. G. ABRAHAM ET AL  2,370,385
METHOD OF ACOUSTIC MEASUREMENT AND APPARATUS THEREFOR
Filed Nov. 17, 1942
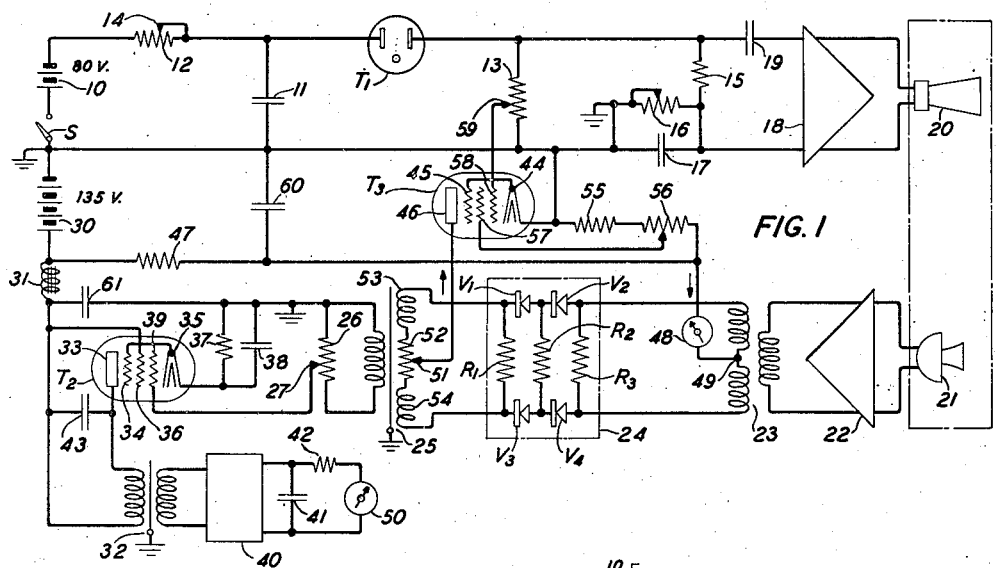
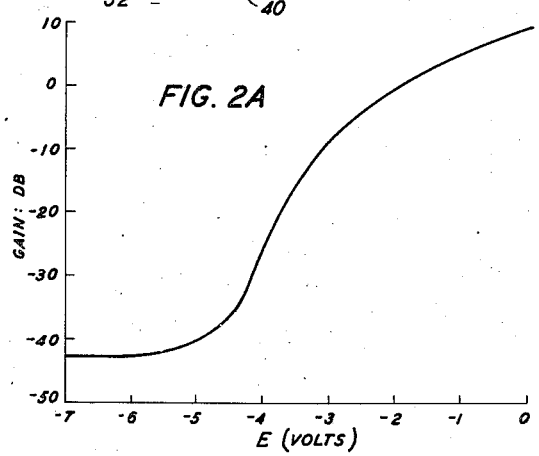
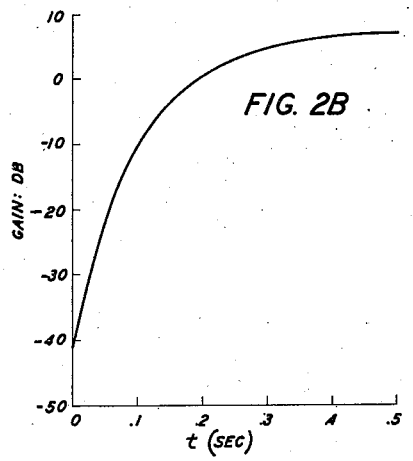
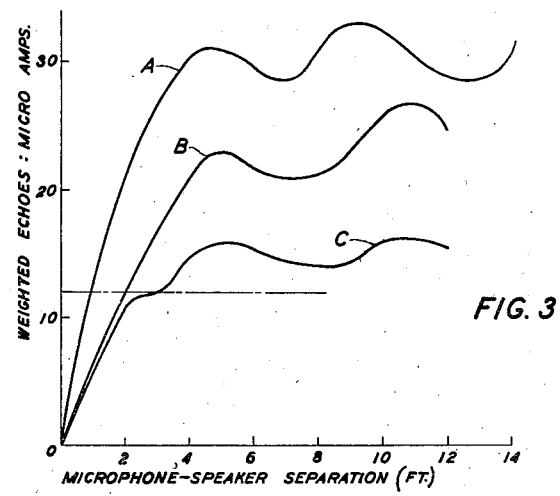
INVENTORS: L. G. ABRAHAM
D. MITCHELL
BY
G. H. Hecydtt.
ATTORNEY Patented Feb. 27, 1945

2,370,385

UNITED STATES PATENT OFFICE 2,370,385

METHOD OF ACOUSTIC MEASUREMENT AND APPARATUS THEREFOR

Leonard G. Abraham, Madison, and Doren Mitchell, Bound Brook, N. J., assignors to Bell Telephone Laboratories, Incorporated, New York, N. Y., a corporation of New York Application November 17, 1942, Serial No. 465,842

9 Claims. (Cl. 181—0.5)

This invention relates to means for determining the acoustic character of a room or other enclosure, particularly with reference to measuring the echoes evoked in such enclosure by sounds of short duration generated therein. The invention resides in the coaction of its constituent apparatus elements and in the method of acoustic measurement to which the coacting elements are adapted.

An object of the invention is to facilitate the making of acoustic determinations.

Another object of the invention is to provide a method and apparatus whereby the acoustics of rooms or other enclosures may be rapidly evaluated.

Since the disturbing effect of echoes depends on their magnitude relative to the original sound, another object of the invention is to provide a method and apparatus with which the echoes evoked by sound pulses in the enclosure may be measured as related to the sound pulses themselves.

Finally, since the disturbing effect of echoes tends to increase with their delay, it is an object of the invention to provide an echo measuring apparatus including weighting means whereby progressively later echoes are assigned progressively greater weights.

A specific problem to which the invention may be applied is the assessment of the suitability of a room for loud-speaking telephone conferences. For the sake of illustration the invention will be described with reference to this application, but it will be clear that no limitation is thereby implied.

For such purposes, each room whose occupants desire to confer by telephone with the occupants of other rooms is provided with a microphone and a loud-speaker. These instruments must be so located with respect to each other that singing is prevented and that echoes from walls or other acoustic reflectors do not confuse the intelligible transmission of speech uttered in the room. It is found by experience that echoes later than the first are progressively more disturbing, from which it appears that the subjective judgment of the suitability of a room involves a spontaneous although perhaps unrecognized weighting of the echoes wherein greater and greater weights are assigned to the successively later echo components. Subjective judgments of this kind are reliable when made by a trained crew of talkers and listeners but the training of such crews is expensive and their observations time consuming. By the use of the present invention the desired acoustic assessment is made rapidly and impersonally.

The invention will be understood and objects other than those explicitly stated will become apparent from the following description read in connection with the accompanying drawing, in which:

Fig. 1 is a circuit diagram of the apparatus of the invention;

Fig. 2A is a curve showing the measured relation between the grid voltage of a vacuum tube controlling transmission of the measuring circuit of the apparatus of Fig. 1 and the transmission thereby controlled;

Fig. 2B is a computed curve showing the relation between the transmission of the measuring circuit and the time elapsed since the establishment of controlled transmission; and Fig. 3 exhibits for several rooms the results of measurements made by means of the invention.

Referring to Fig. 1, 80-volt battery 10 charges condenser 11 through resistor 12. Condenser 11 is shunted by a circuit comprising in series discharge tube $T_1$ and potentiometer 13. $T_1$ is a "Thyratron," for example, the Western Electric 313—C, of which the breakdown voltage is 70 volts or somewhat less than that of battery 10. When condenser 11 acquires a charge of 70 volts, tube $T_1$ becomes conducting and condenser 11 discharges through $T_1$ and potentiometer 13. It is obvious that any other "Thyratron" may be substituted for $T_1$, it being required only that the voltage of battery 10 be somewhat above its breakdown point. Condenser 11 and resistor 12 together determine the frequency of recurrence of the breakdown of tube $T_1$. For the present specific application, condenser 11 is 1 microfarad capacitance and resistor 12 of 10 megohms resistance, corresponding to an interval of one-half second between successive discharges of condenser 11. Obviously, this interval may be varied to suit the particular circumstances in which the invention is to be used. Conveniently, tap 14 on resistor 12 is provided for such variation.

The required poling of battery 10 is shown in Fig. 1. Positive battery terminal is connected through switch S to one terminal of condenser 11, to ground and to the end of potentiometer 13 remote from tube $T_1$. With this connection, in the discharge of condenser 11 a sharp voltage pulse appears across potentiometer 13, the end thereof remote from ground becoming negative to ground. Shunting potentiometer 13 is the series connection of resistor 15 and potentiometer 16, the latter element being itself shunted by condenser 17. The negative voltage pulse across potentiometer 13 also affects the circuit path 15, 16. Resistor 15 is conveniently of resistance 600 ohms and the voltage pulse across it is impressed on the input circuit of amplifier 18 which is of any convenient type. The input circuit of amplifier 18 is protected from direct voltages by stopping condenser 19 of about 8 microfarads capacitance. The output terminals of amplifier 18 are connected to loud-speaker 20, which serves to translate into a sharp sound pulse the voltage pulse appearing across resistor 15.

At any desired distance from loud-speaker 20 is placed microphone 21 which is therefore capable of receiving sharp sound pulses from loud-speaker 20 and such echoes of that pulse as may be returned by sound reflecting surfaces in the neighborhood. The output of microphone 20 after transmission through a circuit later to be described furnishes the information sought in the study of the enclosure indicated by the dashed line of Fig. 1, wherein the apparatus is installed. It is optional to install the entire apparatus or only loud-speaker 20 and microphone 21 in the enclosure to be studied.

It was mentioned above that potentiometer 16 is shunted by condenser 17, the capacitance of which is 1 microfarad. Condenser 17 is itself rapidly charged through resistor 15 by the discharge current from condenser 11 and at once begins slowly to discharge through the parallel paths 15, 13 and 16. The rate of discharge of condenser 17 is determined by the resistances of potentiometers 13 and 16, that of resistor 15 being negligible in comparison. Suitable values for the resistance of potentiometers 13 and 16 are 500,000 ohms and 300,000 ohms, respectively, the latter value being obtained by adjustment of a tap on potentiometer 16. With these resistances, condenser 17 discharges through approximately 200,000 ohms, giving a time constant of 0.2 second, insuring that condenser 17 shall be completely discharged before it recharges as the result of another breakdown of tube $T_1$. In the comparatively slow discharge of condenser 17 the voltage negative to ground across potentiometer 13 is progressively annulled.

The output of microphone 21 is amplified by amplifier 22, and is transmitted through transformer 23 to weighting circuit 24, the control of which is presently to be described, thence through transformer 25 to potentiometer 26, a selected portion of which forms the control grid to ground circuit of vacuum tube $T_2$. Tube $T_2$ may properly be a pentode, for example, the Western Electric 310—A. Grounded in common with the positive terminal of battery 18 is the negative terminal of battery 30, of voltage approximately 135 volts. Battery 30 supplies from its positive terminal through inductance 31 and the primary winding of transformer 32 a suitable voltage to anode 33 of tube $T_2$. In this tube the electrodes are conveniently connected, the suppressor grid 34 to cathode 35, screen grid 36 through inductance 31 to the positive terminal of battery 30, cathode 35 to ground through biasing resistor 37 by-passed by condenser 38, and control grid 39 to a point on potentiometer 26 selected by tap 27. Suitably inductance 31 is 30 henries; resistor 37, 500 ohms; condenser 38, 25 microfarads.

Tube $T_2$ is therefore a straightforward amplifier fed through transformers 23 and 25 from the amplified output of weighting circuit 24 from the amplified output of microphone 21. Tap 27 of potentiometer 26 serves as a volume control. If it is desired for any purpose to provide an amplification characteristic for the circuit of tube $T_2$ having a droop at low and at high frequencies, this may be accomplished by connecting condenser 43 in parallel with the primary of transformer 32. In a particular case where transformer 32 was the Western Electric 132—A, a capacitance of 0.007 microfarad for condenser 43 provided the desired frequency characteristic.

The output of tube $T_2$ is transmitted through transformer 32 to rectifier 40, which may be of any convenient design. The steady voltage derived from the rectifier 40 charges condenser 41, which slowly discharges through resistor 42 in series with ammeter 50. Appropriately, 500 microfarads is the capacitance of condenser 41 and 50,000 ohms the resistance of resistor 42. The time constant of condenser 41 and resistor 42 is then 25 seconds, great enough to insure that the sound pulses emitted by loudspeaker 20 at a recurrence frequency of 2 cycles per second shall after a short time be manifested as a steady deflection on meter 50.

With the circuit described, a sharp sound pulse lasting about 10 milliseconds is produced by a loud-speaker 20. This pulse with all its following echoes will be measured by meter 50 provided the weighting circuit 24 is left uncontrolled. As previously mentioned, it is desired as part of the observing method to measure the echoes alone, giving progressively greater weight to progressively later echo components. This is accomplished by weighting circuit 24 which is preferably composed of thermosensitive elements such as Western Electric 19—A varistors, described in Patent 2,106,344 to J. R. Flegal et al., January 25, 1938. Such circuit elements have an impedance to alternating current which is lower the greater the direct current flowing through them. Within the rectangle indicated by numeral 24, four 19—A varistors $V_1$, $V_2$, $V_3$ and $V_4$ are shown in tandem pairs shunted terminally and centrally by 300-ohm resistors $R_1$, $R_2$ and $R_3$.

In the present invention the controlling direct current is that flowing in the input circuit of tube $T_3$, suitably the Western Electric 310—A. Cathode 44 and suppressor grid 45 of $T_3$ are grounded and so connected to the negative terminal of battery 30. Positive terminal of battery 30 is connected through resistor 47 and milliammeter 48 to center point 49 of the secondary winding of transformer 23, thence through weighting circuit 24 to tap 51 on resistor 52 of approximately 200 ohms in series between the two halves 53 and 54 of the primary winding of transformer 25, thence to anode 46 of tube $T_3$. Tap 51 is provided to permit equal division of the anode current of tube $T_3$ between the upper and lower varistor paths. Between cathode 44 and milliammeter 48 are connected resistor 55 and potentiometer 56 in series, which are conveniently of resistances 2,000 ohms and 10,000 ohms, respectively. The tap on potentiometer 56 is adjusted to provide a suitable positive voltage on screen grid 57 of tube $T_3$. Control grid 58 of tube $T_3$ is connected to tap 59 of potentiometer 13. The anode current of tube $T_3$ read on milliammeter 48 is controlled by the voltage of control grid 58, namely, the voltage between tap 59 and ground. Condenser 60 of about 4 microfarads capacitance, together with 1,000-ohm resistor 47, serves to filter the current from battery 30 to anode 46. Similarly, 4-microfarad condenser 61 cooperates with inductance 31 to filter the anode current of tube $T_2$.

The discharge of condenser 11 results in a sharp negative voltage pulse across potentiometer 13 and any desired fraction of this pulse may by adjustment of tap 59 be impressed on control grid 58. For the circuit described, it is convenient to adjust tap 59 so that grid 58 shall become 5 volts negative at the commencement of the voltage pulse across potentiometer 13. This negative voltage on grid 58 suffices to drive tube T3 to cut off and vanishes comparatively slowly with discharge of condenser 17, whereby the conductivity of tube T3 is gradually reestablished. Accordingly, at the outset of the discharge on condenser 11 the anode current of tube T3 is sharply reduced and gradually recovers its normal value. This anode current flowing through weighting circuit 24 in the direction indicated by the arrow confers on circuit 24 an alternating current impedance initially high but gradually reduced to the value corresponding to the anode current of tube T3 when the voltage on control grid 58 is zero.

The recovery of conductivity by tube T3 and of transmission by circuit 24 is substantially complete within the half second elapsing between successive discharges of condenser 11. The 10-millisecond direct sound pulse from loud-speaker 20 is received by microphone 21 but is substantially completely excluded from affecting meter 50, whereas the successive echoes following this pulse are permitted by the gradually restored transmission of circuit 24 to contribute increasingly to the reading of meter 50. This effect is produced at each recurrence of a sound pulse and is integrated to cause a steady reading of meter 50.

The curve of Fig. 2A is plotted from measurements of over-all gain between the input to weighting circuit 24 and the input to rectifier 40 for steady negative voltages on grid 58 varying from −5 volts to zero. As a first approximation, the negative pulse across potentiometer 13 and so the voltage of control grid 58 may be taken to vanish exponentially. Assuming an exponential variation of the voltage of control grid from −5 volts to zero, the voltage E of grid 58 may be expressed as follows:

$$E = -5e^{-\frac{t}{RC}}$$

where
R = 200,000 ohms
C = 1 microfarad
t = the time in seconds elapsed since the onset of the negative voltage pulse across the potentiometer 13.

The value of E computed together with the observations plotted in Fig. 2A yield the curve of Fig. 2B, which is similar to 2A except that time replaces grid voltage on the axis of abscissae. It will be clear from inspection of Fig. 2B that the direct sound pulse is substantially disregarded, whereas later and later echoes are progressively more and more effective.

In the survey of a given room it is convenient to place loud-speaker 20 and microphone 21 at a separation estimated to be acceptable and proceed as follows:

First, tap 59 is set at the grounded end of potentiometer 13. The circuit is then set in operation by closing the switch S. No negative voltage then appears on the control grid of tube T3 and meter 50 reads, after a short interval, a steady deflection corresponding to the direct sound pulse and all its echoes without discrimination. Potentiometer 26 is then so tapped as to cause meter 50 to read 100, or any convenient arbitrary value. The echoes are ordinarily of small magnitude in comparison with the direct sound so that the reading of the meter 50 may be considered correspondent to the direct sound alone. Next, the tap on potentiometer 13 is set to introduce weighting of the echoes. The reading of meter 50 will now decrease to a new value, in general too small for accurate reading, so that it is convenient to increase the setting of tap 27 on the potentiometer 26 by some predetermined amount. It is then necessary to determine the optimum setting of tap 59 and the optimum fraction of potentiometer 16 which shall shunt condenser 17. Various procedures to this end may be found practically useful, one of which will now be described.

Having altered the setting of tap 27 on potentiometer 26 by a known amount sufficient to afford a convenient reading on meter 50, one may repeat the steps above described for a different microphone loud-speaker separation and set tap 59 so that one obtains the greatest percentage difference between the readings of the weighted echoes by meter 50 in the two separations of microphone and loud-speaker. The adjustment of potentiometer 16 is chosen in the same way. It is desirable thereafter to leave undisturbed the optimum settings thus established.

For each microphone loud-speaker separation to be observed, it is appropriate to repeat the calibration of the circuit by causing meter 50 to read a predetermined current value corresponding to the unweighted echoes. Following this calibration, one reads the weighted echoes alone, having made for this reading alteration in scale by resetting tap 27 as already found convenient. The reading of the meter for the weighted echoes is now a measure of the acoustic excellence of the room. Repeating the observations above described at various microphone loud-speaker separations, it is thus possible to establish a standard reading for the weighted echoes which corresponds to the maximum microphone loud-speaker separation judged acceptable by the human listeners. Once this standard is established, the testing crew may be replaced by the apparatus of the invention and the desired information rapidly obtained.

In Fig. 3 are plotted curves showing for several rooms the weighted echoes measured by the apparatus of Fig. 1 used as just described for various separations of microphone and loud-speaker. It will be noted that the reading of 12 microamperes on meter 50 corresponds in rooms A, B and C to the microphone loud-speaker separation of 1, 2 and 3 feet, respectively. From judgments by an observing crew, the maximum acceptable separations were for the same rooms, ½, 2 and 3 to 4 feet, respectively.

The apparatus of the invention may be briefly described as comprising a generator of recurrent sharp voltage pulses translated by a loud-speaker into corresponding sound pulses which are thereupon retranslated by a microphone into electrical currents supplied to an integrating meter through a circuit, the transmission of which varies with time in a manner controlled by the comparatively slow discharge of a condenser initially charged at each recurrence of the generated voltage pulse. The separate constituent elements of the apparatus described may each be replaced by one of any other type capable of the same function as may be preferred by one skilled in the art without ceasing to use the method of the invention, which consists in measuring with progressively increasing weights the successively later echoes evoked by a sound pulse and comparing the integrated measurement of the echoes with a measurement of the echo evoking pulse, thereby evaluating the disturbing effect of the echoes and thus the acoustic quality of the space in which they are produced.

While the invention has been described with reference to a particular application, obviously it is generally applicable to the evaluation of the acoustic quality of any enclosure. For this purpose it is desirable to choose a fixed separation of microphone and loud-speaker and make measurements of the kind described in enclosures known to be acoustically acceptable. By such measurements one may establish a standard reading of meter 50 for the weighted echoes. Comparing with this standard similar measurements made with the chosen microphone-loudspeaker separation in any enclosure, one is enabled to assess the acoustic quality of the enclosure measured and determine the need for treatment to render it acoustically satisfactory.

What is claimed is:

1. The method of evaluating the acoustic quality of an enclosure which consists in generating a series of recurrent sound pulses in said enclosure to evoke echoes therein, receiving and measuring said echoes with the assignment of progressively increasing weighting to successively later components of said echoes, and comparing the result of said measurement with a previously established standard.

2. The method of evaluating the acoustic quality of an enclosure which comprises a first step of generating in said enclosure a first series of recurrent sound pulses evoking echoes therein and measuring with equal weighting the components of said first series of sound pulses and echoes, a second step of generating in said enclosure a second series of recurrent sound pulses and echoes similar to said first series and measuring the components of said second series with substantially zero weighting of the sound pulses thereof but with progressively increasing weighting of progressively later echoes thereof, and a third step of comparing the measurement made in said second step with the measurement made in said first step.

3. An electrical impulse generating circuit, an electrical impulse receiving circuit, an acoustic link between said circuits, and means to vary the transmission efficiency of said receiving circuit with respect to time under the control of said generating circuit.

4. In an apparatus for evaluating the disturbing effect of acoustic echoes, means for generating a sound pulse evoking echoes, means for receiving and measuring said pulse together with the echoes thereby evoked, and means adjustably associated with said generating means for controlling as a function of time the efficiency of said receiving and measuring means.

5. Means for evaluating the acoustic quality of an enclosure including a generating circuit producing sound pulses evoking echoes in said enclosure, a receiving circuit for measuring said echoes, and a disabling circuit excited by said generating circuit and controlling as a function of time the efficiency of said receiving circuit.

6. Means for evaluating the acoustic quality of an enclosure including a generating circuit producing sound pulses evoking echoes in said enclosure, a receiving circuit for measuring said echoes, said receiving circuit including an array of thermosensitive elements, and a disabling circuit excited by said generating circuit and controlling as a function of time the impedance to alternating current of said array.

7. Means for evaluating the acoustic quality of an enclosure, including a generating circuit producing sound pulses evoking a plurality of successive echoes in said enclosure, a receiving circuit for measuring said pulses and said echoes, and a disabling circuit excited by said generating circuit to annul substantially completely the efficiency of said receiving circuit during the reception of said pulses and to restore said efficiency progressively with time during the reception of said echoes.

8. In an apparatus for evaluating the acoustic quality of an enclosure bounded at least in part by sound reflecting surfaces, means for generating in said enclosure recurrent sound pulses individually evoking echoes from said surfaces including electrical means for generating recurrent voltage pulses and a loud-speaker driven by said voltage pulses, means for receiving and measuring said sound pulses and echoes including a microphone, a weighting circuit of controllable transmission associated with said microphone and an integrating measuring circuit, and means adjustably associated with said generating means for controlling as a function of time the transmission of said weighting circuit.

9. In an apparatus for the measurement of the trains of echoes evoked by recurrent sound pulses, a generator of recurrent voltage pulses, an output circuit for said generator, a loud-speaker coupled to said output circuit for translating said voltage pulses into sound pulses, a shunt circuit connected in parallel with said output circuit, said shunt circuit comprising a condenser in series with a potentiometer, said condenser being itself shunted by an adjustable resistor, a vacuum tube having at least a control grid, a cathode and an anode, power supply for said tube, an adjustable tap on said potentiometer connected to said control grid, a transmission path in series between the anode and the cathode of said tube, said path being composed of two parallel banks of thermosensitive elements in tandem connection joined by resistors at a plurality of corresponding points, a first transformer having primary and secondary windings of which the secondary winding joins at one end said banks and is connected at its mid-point to said cathode, a second transformer having primary and secondary windings of which the primary winding is composed of two portions connected by a tapped potentiometer the tap on which is connected to said anode, a microphone receiving said sound pulses and echoes thereby evoked, coupling between said microphone and the primary winding of said first transformer, a rectifying circuit, coupling between said rectifying circuit and the secondary winding of said second transformer, and an integrating measuring circuit coupled to said rectifying circuit.

LEONARD G. ABRAHAM.
DOREN MITCHELL.